Jan. 7, 1964   M. E. WOOD   3,116,893
SPINNING REEL
Original Filed Feb. 21, 1957   5 Sheets-Sheet 1

INVENTOR.
MORRIS E. WOOD
BY
Charles S. Perfll
ATTORNEY

United States Patent Office 3,116,893
Patented Jan. 7, 1964

3,116,893
SPINNING REEL
Morris E. Wood, Bronson, Mich., assignor, by mesne assignments, to Bronson Specialties, Inc., Bronson, Mich., a corporation of Michigan
Continuation of application Ser. No. 641,711, Feb. 21, 1957. This application July 25, 1960, Ser. No. 45,241
5 Claims. (Cl. 242—84.2)

The invention relates generally to fishing reels and more particularly is directed to reels known as the spinning type.

This application is a continuation of application, Serial No. 641,711, filed February 21, 1957, and now abandoned.

One of the principal objects of the invention is to provide a reel of the spinning type in which the line is guided axially onto and off a spool in a manner whereby to prevent the line from twisting. In other words, provision is made for complete control of the line to maintain it in a normal condition within the confines of the reel to avoid snarling or entanglements with any of the internal fixed or movable components of the reel structure.

The reel embodying the invention includes, among other things, a spool, a line pickup, operating means for imparting relative rotational movement between the spool and pickup to direct a line onto the spool, a pair of axially disposed clamping elements, and actuating means for imparting relative axial movement between the clamping elements through movement of the spool for braking the movement of the line between the elements. One of the clamping elements is preferably made in the form of a brake drum located forwardly of the spool and the other clamping element preferably constitutes a component of the spool unit or assembly and is preferably made in the form of an annular guard or ring to assist in controlling movement of the line within the reel when the clamping elements are manipulated.

A specific object of the invention is to mount the clamping elements in a manner whereby they may be revolved in unison when in clamping relationship to brake movement of the line when the line is being pulled from the reel. These clamping elements are operatively related and actuated so as to provide a "feathering" or graduated line controlling means, thereby eliminating the sudden or too abrupt braking action usually present in reels of the spinning type.

An important object of the invention is to provide means for imparting relative axial movement between the spool unit and the pickup to render the pickup and the clamping elements inoperative in order to permit the line to freely unwind from the spool as desired when a cast is made. The arrangement is preferably such that the line in a casting operation will run radially outward from the spool and over the front clamping element or drum as distinguished from passing over any frontal flange or portion of the spool. In fact, the spool and pickup are so designed and constructed that the line will not ride axially over any portions thereof.

Another important object of the invention is to provide the cap with a line guide opening in front of the brake drum and form the brake drum and the cap in a way that movement of the line in passing from and onto the spool is controlled thereby with the rear guard ring serving to prevent the line from working to the rear of the spool. In other words, the guard, brake drum and cap are arranged in a predetermined relationship to control or influence movement of the line when a cast is made and without interference by the pickup. When the line is being retrieved and directed onto the spool the cap and brake drum will also serve to control movement of the line therebetween but the guard ring will not normally assist in this respect.

A further object of the invention is to provide means for holding the pickup in a nested or inoperative position within the confines of the brake drum when a cast is made and an arrangement for automatically returning the pickup to an operative position to direct a line onto the spool when the driving means of the reel is rotated in a line winding direction.

A significant object of the invention is to provide a unique spring clutch mechanism operatively associated with the drive shaft and gear driven thereby, including drag means operatively associated with the clutch mechanism and gear. More particularly in this regard, the objective is to provide a novel combination comprising a stationary spool or line receiving means and a clutch mechanism and drag means which are operatively related in such a manner that the clutch mechanism may be utilized to drive the drive gear, release it for free rotation in a reverse direction with resepct to its mounting or apply a retarding action thereto. The arrangement is preferably such that the clutch may be employed separately or jointly with the drag means and the latter independently of the clutch.

A specific object of the invention is to provide a novel way of detachably connecting the drum and pickup and mode of mounting these components on a support so that the pickup may be moved axially with respect to the drum and cooperate with the support for holding the pickup substantially within the drum when a cast is made.

Another object of the invention is to provide an improved setup for detachably holding the spool and guard ring as a unit in a predetermined relationship to the support which carries the drum and pickup.

A particular object of the invention is to provide the pickup with straight axially disposed fingers and form the fingers and material of the pickup adjacent the fingers in such a manner that the wear of a line riding thereon is reduced to a minimum.

Other objects and advantages of the invention will become apparent after the description hereinafter set forth is considered in conjunction with the drawings annexed hereto.

In the drawings wherein a preferred embodiment of the reel is exemplified.

Figure 12:
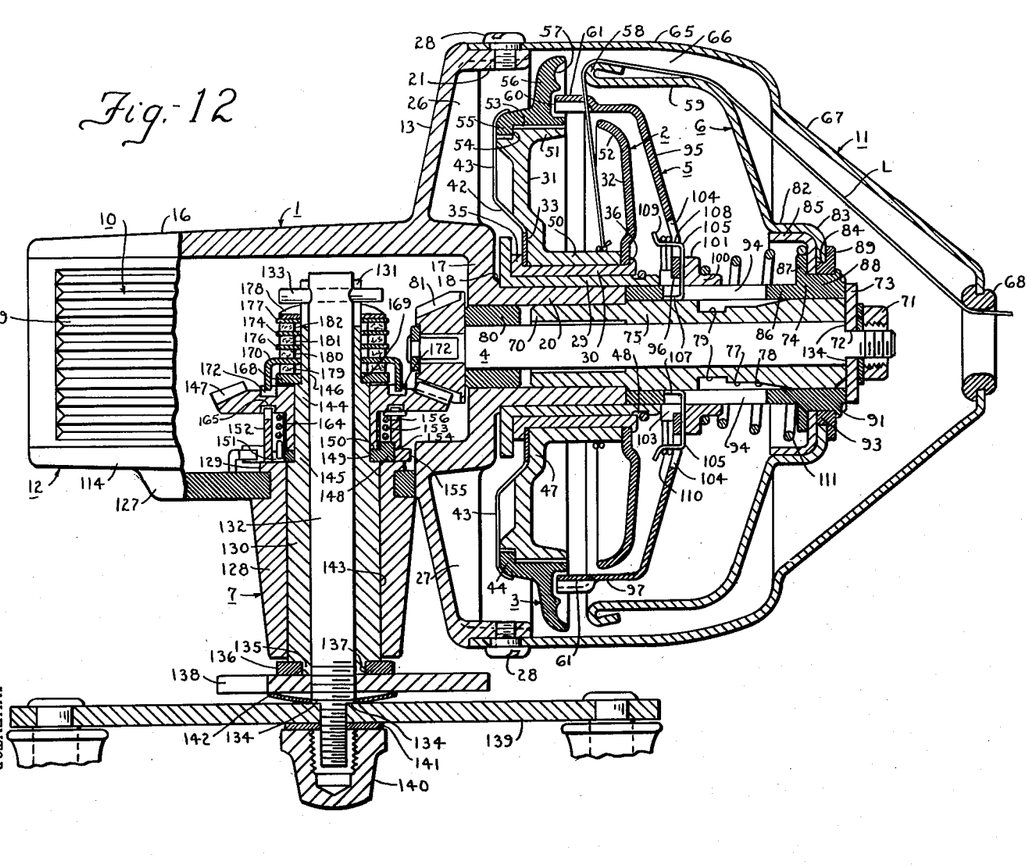
FIGURE 12 is an enlarged horizontal section of the reel illustrating structural details and with the components disposed for winding or directing a line onto the spool.
Figure 13:
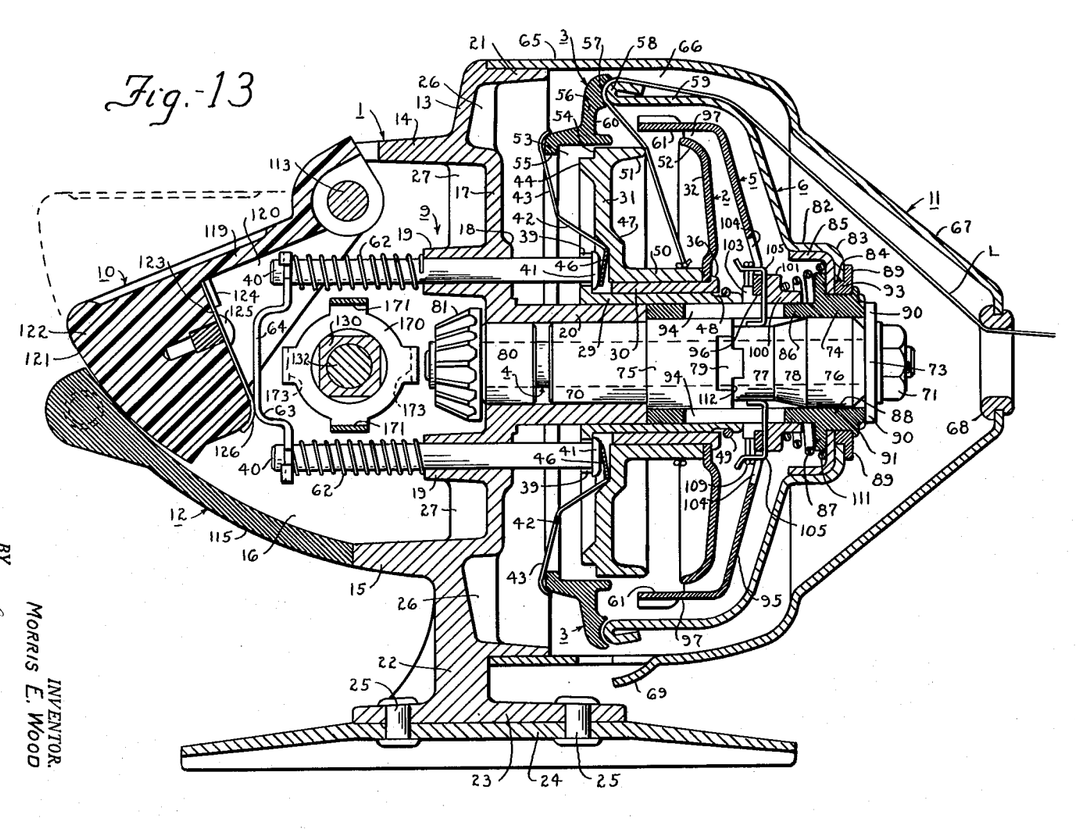
FIGURE 13 is an enlarged vertical section of the reel showing the line pickup in a nested or inoperative position within the brake drum and with the line clamped between the drum and rear guard ring.

Referring generally to the reel structure exemplified in FIGURES 12 and 13 of the drawing, numeral 1 designates a frame, 2 a spool assembly having a guard ring 3, 4 a rotatable driven shaft, 5 a line pickup mounted for movement and for axial movement relative to the spool assembly, 6 a brake drum rotatably mounted on the fore end of the shaft, 7 operating or driving means for driving the shaft and pickup, 8 drag means associated with the operating means, 9 actuating means connected to the spool, 10 a manual actuator for moving the actuating means to impart relative axial movement between the spool assembly and drum, 11 a cap connected to the frame for covering the components in front of the frame, and a closure 12 cooperating with the frame for covering those components at the rear thereof.

The reel frame 1 is preferably cast or moulded from a suitable material and, among other things, includes a round wall 13, rearwardly extending top and bottom walls 14 and 15 and a side wall 16. The wall 13 is provided with a centrally disposed forwardly extending generally rectangular formation 17 defining an upstanding rectangular recess at the rear side of the wall 13. The top and bottom walls 14 and 15 and side wall 16 constitute continuations of the walls defining the recess. The formation 17 has a base provided with a circular front round boss 18 and tubular formations 19 extending rearwardly from the base into the recess. The round wall 13 has a centrally disposed tubular bearing or support 20 extending forwardly from the boss 18. The wall 13 is further provided with an inset forwardly extending rim or peripheral flange 21 on which the cap 11 is detachably mounted. The frame also includes a depending offset 22 having a longitudinal portion 23 provided with a concave seat in which a plate 24 is secured by rivets 25 for attaching the reel to a pole or rod to place the longitudinal axis of the reel in parallel relation to the longitudinal axis of the pole or rod. It will be noted that the rectangular formation 17 is preferably reenforced by radial webs 26 joining the formation with the flange 21 and that the tubular formations 19 are reenforced by webs 27. The flange 21 is preferably thickened at diametrically spaced locations and provided with threaded apertures within which screws 28 extend and for reception in slots provided in the cap 11 for detachably securing the cap on the flange as shown in FIGURE 12.

The spool assembly 2 is mounted on a tubular fitting or sleeve 29 and includes a tubular bushing 30, a rear plastic spool flange 31, a front metal spool flange 32, a flexible member 33, and the guard ring or clamping element 3 above referred to. These components are all connected together to constitute a unit which is mounted for axial movement with the fitting 29 on the tubular bearing 20 on front of the wall 13 through the intermediation of the actuating means 9 and the manual actuator 10 therefor. The bushing 30 extends through holes provided in the spool flanges and through a hole provided in a hub 34 of the flexible member 33. The bushing includes an inner radial flange 35 bearing against the hub and an outer end upset at 36 against a recessed portion of the front spool flange for permanently securing the parts constituting the unit together. The inner radial flange 35 of the bushing is provided with diametrically disposed notches 37, the purpose of which will be described subsequently.

Figure 16:
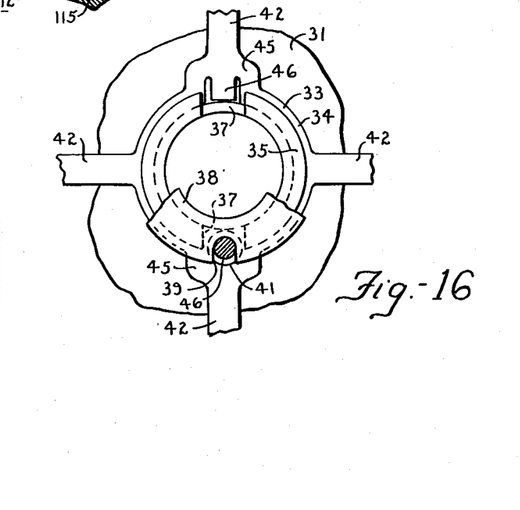
FIGURE 16 is a partial view showing the structural characteristics of the spool assembly and guard ring, and the means utilized to resiliently support the ring.

More particularly, the tubular fitting 29 serves as a support for the spool flanges, bushing, flexible member and guard ring. The fitting slides on the support 20 and is provided with a rear radial flange 38 having a pair of notches 39 therein for respectively receiving a pair of corresponding plunger rods 40 constituting components of the actuating means 9. The radial flange 38 bears against the boss 18. The rods are slidably mounted in the tubular formations 19 and extend through the boss 18 for imparting forward axial movement to the spool assembly. The bushing 30 is mounted on the fitting 29 and its radial flange 35 bears against the radial flange 38 of the fitting with its notches 37 registering with the notches 39 in the flange 38 for receiving heads 41 formed on the fore ends of the rods. The flexible member 33 includes the hub 34 from which extends four offset corresponding equally spaced apart resiliently flexible radial legs 42 having ends to provide individual seats 43 which normally bear against a rear rim 44 of the rear spool flange 31 and hold the guard ring 3 assembled with the spool while allowing the ring 3 to rotate on the seats. The hub 34 is provided with a pair of diametricaly disposed enlargements 45 adjacent a pair of the radial legs and these enlargements are respectively provided with struckout resilient projections 46 which extend into the notches 39 in the bushing for engagement with the heads 41 of the plunger rods, as shown in FIGURES 13 and 16, for the primary purpose of preventing vibration or rattle between the spool assembly and the rods and between the spool assembly and its support. It will be noted that the rear side of the rear spool flange is also recessed as at 47 with the hub of the flexible member seated thereagainst and with the rear flange 38 of the bushing bearing against the hub, the arrangement being such that the flange 38 and hub are disposed within the confines of the recess.

The fore part of the fitting 29 is provided with an annular exterior groove 48 which receives a locking part 49, preferably in the form of a resilient clip for holding the spool unit comprising the flanges, bushing, flexible member and guard ring detachably connected to the fitting 29.

The rear spool flange 31, as alluded to above, is preferably made from plastic and is provided with a forwardly extending cylindrical axial hub 50 which bears against the rear surface of the recessed portion of the front spool flange 32 so that inturned opposed axially extending peripheral portions 51 and 52 of the flanges 31 and 32 of the spool will be maintained in a predetermined spaced relationship to provide a throat or passage through which a line L may radially pass. The peripheral portion 51 of the rear spool flange is rounded in order to reduce the wear thereon including the line when the line is being drawn outwardly between the drum and guard ring. It will be noted that the front spool flange is of a slightly greater diameter than the rear flange and generally conical or dished in shape so that the line will not ride over the spool flanges when the line is being wound on or released from the spool; that the rear spool flange is formed to nest within a front recess 53 formed in the guard ring 3, and that the rear side of the rear flange is provided with an annular abutment 54 for engaging a base wall or flange 55 on the guard ring. It will be further noted that the flange 55 is interposed between the spool flange 31 and the flexible member 33. The ring also includes a radial peripheral flange 56 provided with an outer annular concave groove 57 at its front side for receiving a rear annular rounded marginal edge 58 of a cylindrical peripheral portion 59 of the brake drum 6 when the spool assembly is moved forwardly a predetermined distance by depressing the actuator 10 with a digit of the hand, such as the thumb. The radial flange 56 of the ring is also provided with an inner annular groove 60 concentric to and slightly deeper than the concave groove 57 for receiving four fingers 61 extending rearwardly from the pickup when the latter is in a line winding position. It will be noted that the front edges of the guard ring are normally disposed substantially in the same plane as the front edge of the rear spool flange 31.

Figure 14:
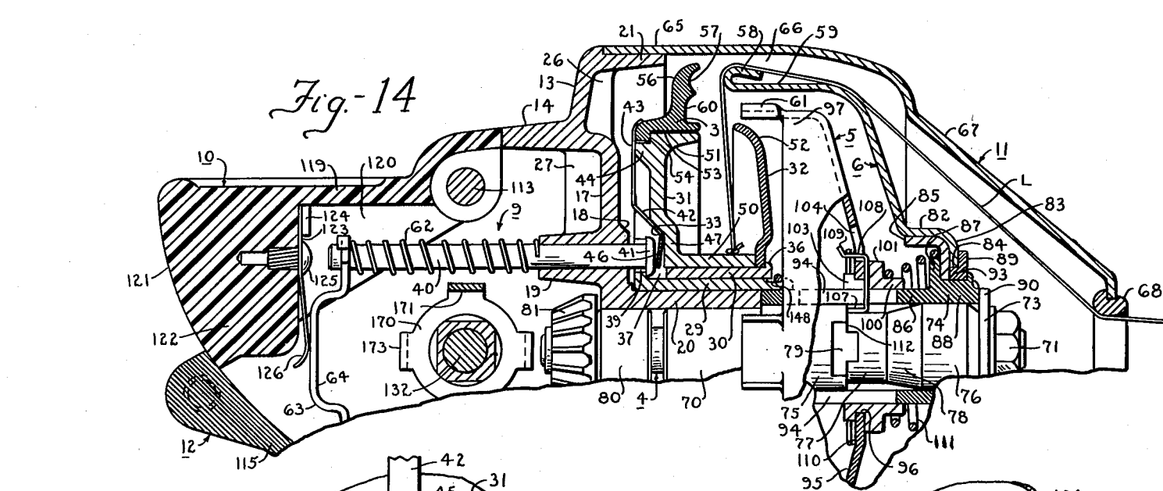
FIGURE 14 is an enlarged partial sectional view of the structure shown in FIGURE 13 exemplifying the actuator and actuating means in a retracted condition and the pickup in a locked forward position within the drum.

The spool assembly is preferably normally held in a rear retracted position, as shown in FIGURE 12, by a pair of helical springs 62 surrounding the plunger rods 40. The rear end of each rod is preferably provided with a reduced portion. A bridge 63 is provided with offset ends having notches which receive the reduced portions of the rods with portions of the ends of the bridge being upset to lock the bridge to the rods as illustrated in FIGURES 13 and 14. The bridge includes an intermediate portion 64 for engaging the actuator 10. The ends of the springs respectively bear against the tubular formations 19 on the frame and the offset ends of the bridge 63. The mode of actuating the plunger rods by the actuator 10 and the manner of mounting the actuator on the closure 12 and the side wall 16 of the reel frame will be described subsequently.

Attention is directed to the fact that portions of the guard ring and brake drum are preferably disposed in spaced concentric relationship about the spool as well as about the pickup for controlling and/or clamping the line preferably at a point located exteriorly of the spool and pickup. Of further importance is the fact that the radial portion 56 of the guard ring serves to prevent the line from working back and in between the ring and front flange 21 of the reel frame. The relative close fitting nesting relationship of the ring and rear spool flange also serves to prevent the line from receding therebetween. The axial relationship of the ring and the cylindrical portion 59 of the brake drum and their concentric relationship to a cylindrical portion 65 of the cap 11 define an annular passage 66 for controlling or guiding the line, particularly when it leaves the spool during a cast. The cap is preferably bell-shaped and also includes a front conical portion 67 provided with an eye member 68 at its apex through which the line passes. The eye member is preferably constructed from a suitable hardened material to prevent wear thereon including the line. The cylindrical portion 65 of the cap is preferably provided with a projection or hook 69 extending angularly and rearwardly for convenience in catching a loop of the line L therein so as to prevent accidental release of the line from the spool. It will be noted that the projection depends from the cap and is located in an inset position above the plate 24 so the line in normal use will not become caught thereon.

The pickup, generally designated 5, and drum 6 and mode of mounting same in operative relationship with the spool assembly will now be described. The pickup and drum are detachably connected together to constitute a unit or subassembly which is mounted on the fore extremity of a support preferably in the form of a tubular spindle 70 which has an inner end press fitted into the tubular bearing or support 20 of the frame. This unit is detachably held on the spindle by the driven shaft 4 and a nut 71 threaded thereon. The shaft extends through the spindle for rotation therein and its outer end is squared and received in a square aperture 72 provided in a member 73 abutting a sleeve 74 surrounding the sleeve. The spindle 70 extends into the tubular portion of the slidable sleeve 29 carried by the bearing 20 of the frame 1. The fore extremity of the spindle 70 is provided with axially spaced cylindrical portions 75 and 76 on which the sleeve 74 of the drum 6 is mounted, a reduced cylindrical portion 77 and a tapered portion 78 joining this reduced portion and the cylindrical portion 76. The cylindrical portion 75 is squared at diametrically disposed locations as indicated at 79. The purpose of these various portions on the spindle will be described later.

It will be noted that the inner extremity of the spindle 70 is counterbored to reduce friction between the shaft 4 and the spindle. A bearing 80 is press fitted in the rear end of the tubular bearing 20 for supporting the inner end of the shaft. A drive pinion gear 81, preferably of nylon, is keyed to the inner end of the shaft and engages the bearing 80.

Figure 6:
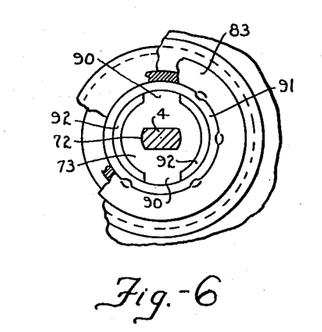
FIGURE 6 is a partial view of the drum and pickup showing the manner of attaching them together.

The drum 6 includes a forwardly extending reduced cylindrical portion 82 having a base wall 83 provided with an opening 84 as depicted in FIGURES 6, 12 and 13. A cup 85 is disposed in the cylindrical portion 82. The sleeve 74 includes a cylindrical portion 86, a flange 87 abutting the inner side of the cup, and a relatively thick cylindrical portion 88 extending through an opening in the cup and an opening in a washer 89 bearing against the outer side of the base wall 83 of the drum. The cylindrical portion 88 of the sleeve is provided with notches which receive radial projections 90 on the member 73 and the portion 88 is upset as indicated at 91 and 92 to respectively secure the washer 89, member 73 and cup 85 on the sleeve 74 for rotation therewith. It will be noted that the washer 89 is provided with an axial portion 93 which is of a length sufficient to extend through the opening 84 in base wall 83 of the drum and engage the base wall of the cup 85 for maintaining the washer and cup in a predetermined spaced axial relationship so that the drum may rotate freely relative to the sleeve 74. The cylindrical portion 86 of the sleeve is provided with opposed corresponding longitudinal slots 94. The diameters or sizes of the various portions of the drum, sleeve and parts carried thereby are such that rotation of the drum is stabilized so that its rounded edge 58 will properly cooperate with the guard ring 3 and otherwise assist in controlling the line to normally hold it away from the front spool flange 32 when the drum is disengaged from the ring. Attention is directed to the important fact that the edge 58 of the drum is made annular so as to present a continuous edge or surface which may be subjected to line wear and thereby prolong the life of the drum and line as distinguished from all known prior constructions in current use which provide a localized area on which the line rides.

The pickup 5 includes a conical wall 95, a center planar wall provided with an opening 96 and an axial annular portion or rim 97 from which extends the four axial fingers 61 above referred to. The fingers are preferably planar and substantially tangent to the rim 97. The longitudinal marginal edge portions of the fingers are preferably angled or curved outwardly as at 98 and the edge of the rim is also slightly flared or provided with formations 99 adjacent the edges of the fingers to provide smooth surfaces for the line and at the same time prolong the life of the line and the pickup. The formations and angled portions of the fingers are treated to harden same for use.

Figure 3:
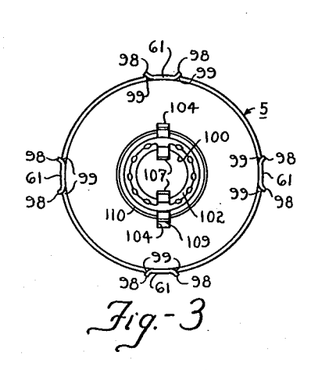
FIGURE 3 is a view of the interior structure of the line pickup.
Figure 4:
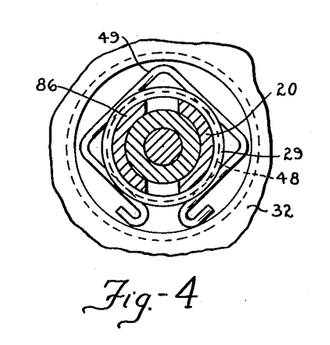
FIGURE 4 is a transverse section showing the manner of detachably holding the spool assembly in relation to a support carried by the reel frame.
Figure 5:
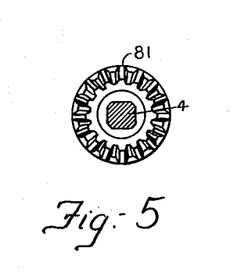
FIGURE 5 is a transverse section taken through the driven shaft with the driven gear mounted thereon.
Figure 15:
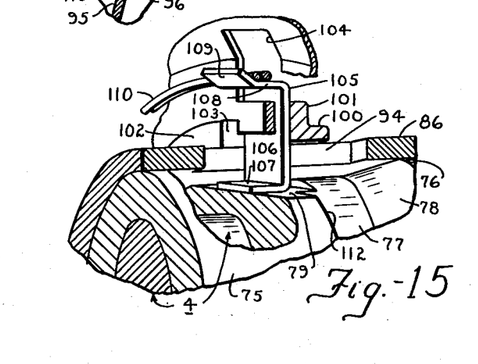
FIGURE 15 is an enlarged perspective of a partial section showing the mode of operatively associating the line pickup with the support which carries the pickup and drum.

The pickup, as mentioned above, is detachably connected to the drum in a unique manner. A tubular fitting 100 is secured in the opening 96 provided in the planar wall of the pickup. This fitting has a flange 101 bearing against the front side of the aforesaid planar wall and an inner portion which is upset against the inner side of the planar wall as indicated at 102 to permanently secure the fitting on the pickup as depicted in FIGURES 3, 14 and 15. The inner portion of the fitting is also provided with a pair of diametrically disposed notches 103 and the conical wall 95 of the pickup is provided with diametrically disposed slots 104 which are aligned with the notches 103. A pair of elements 105 are radially slidable in the notches and slots. More particularly in this regard, each element is preferably generally U-shape in form and includes a portion 106 extending through a notch and overlying the front side of the planar wall of the pickup, an inner rearwardly extending leg 107 and an outer leg 108 extending rearwardly through a slot and provided with an offset 109. A sensitive coiled spring 110 is caught between the offsets and pickup and bears against the outer legs 108 to urge the elements radially inward to normally maintain the inner legs 107 in the opposed projecting relationship in the fitting 100 as shown in FIGURE 3. The inner extremities of the elements also project through the slots 94 in the sleeve 74 on the drum as depicted in FIGURES 12 through 15 for engagement with the various portions of the spindle 70 in a manner which will subsequently be described. With this setup the pickup and drum can be readily detachably connected by sliding the sleeve 74 into the fitting 100 and then manipulating the elements 105 so that they will enter the slots 94 and thereby lock the pickup and drum together and compress a helical spring 111 therebetween. The spring is rather large and tapered and surrounds the sleeve 74 with its large end seated in the cup 85 and its smaller end bearing against fitting 100 for normally maintaining the pickup and drum in spaced axial relationship and urge the pickup rearwardly. The drum and pickup are thus mounted to afford relative longitudinal and/or relative rotational movement therebetween. More specifically in this respect the drum is rotatable but not slidable on the sleeve whereas the pickup is slidable but not rotatable on the sleeve.

The operative relationship of the aforementioned components are such that when the pickup is rotated to direct the line L onto the spool, as evidenced in FIGURE 12, the inner legs 107 of the elements 105 carried by the pickup will ride on the cylindrical portion 75 of the spindle 70, but when the pickup is moved forwardly with the spool by depressing the actuator 10 the elements 105 will automatically move radially inward and engage the reduce cylindrical portion 77 of the spindle as shown in FIGURE 13, and when the actuator is released the spring 111 will force the pickup rearwardly and cause the elements to bear against abutment means in the form of a shoulder or step 112, which joins the cylindrical and reduced portions 75 and 79, and thereby hold the pickup in a forward position within the drum as evidenced in FIGURE 14 to permit free delivery of the line from the spool. The pickup is readily released from its forward nested position in the drum by merely rotating the pickup so that the elements 105 will move against the squared portions 79 of the spindle and then ride out and back onto the cylindrical portion 75 and rearwardly thereon through the agency of the spring 111 which had been compressed by the prior forward movement of the pickup. The tapered portion 78 of the spindle serves to facilitate separation of the drum and pickup from the spindle 70. The arrangement is such that the elements may engage either the squared portion 72 or the shoulder 112 after the pickup moves rearwardly from a shifted forward direction. With this setup the pickup can be moved forwardly and temporarily held in either of two forward positions substantially within the confines of the drum to permit control and/or free release of the line from the spool when or after a cast is made. Irrespective of whether the elements are bearing against the squared portions or shoulder, rotation of the pickup by the driving or operating mechanism will cause the elements to eventually spread apart and ride onto the cylindrical portion 75 of the spindle and thereby allow the pickup to snap back to its normal line winding position through the action of the spring 110, as shown in FIGURE 12. As will be explained more in detail subsequently, when the brake drum and guard ring 3 are in a clamping relationship and a pull is exerted on the line, the drum and ring are free to rotate in unison with respect to the longitudinal axis of the driven shaft 4 when the shaft is idle.

Figure 1:
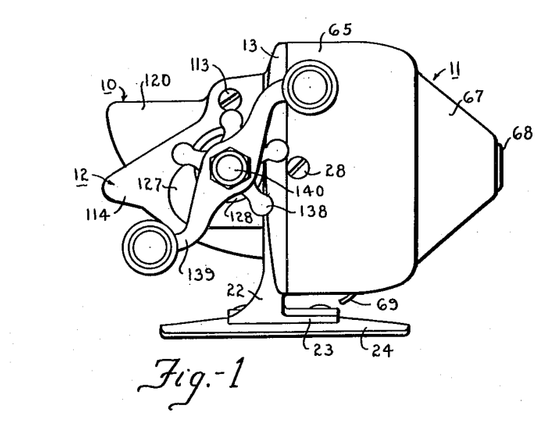
FIGURE 1 is an elevational side view of the reel.
Figure 2:
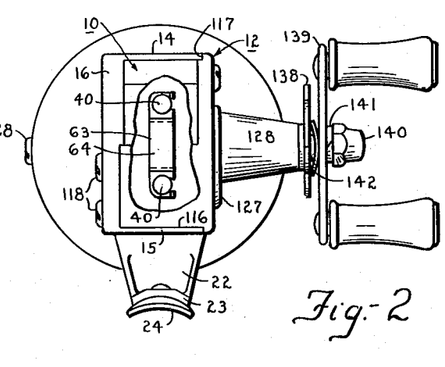
FIGURE 2 is a rear elevational view of the reel with a portion broken away to illustrate a part of the actuating means for the spool unit or assembly.

The actuator 10 and mode of operatively connecting it to the frame 1 and the closure 12 and the plunger rods 40 will now be described. The actuator, as shown in FIGURES 1, 12 and 13, is preferably made in the form of a hollow lever pivoted on a cross-pin or pivot 113 carried by the side wall 16 of the frame and a side wall 114 of the closure 12. The lever is disposed in a generally rectangular opening defined by the top, bottom and side walls of the frame, the side wall 114 of the closure and an arcuate wall 115 offset from the side wall 114. The side walls 16 and 114 are generally triangular and the arcuate wall 115 is notched at 116 to receive the bottom wall 15 and the top wall 14 and side wall 114 are notched to interengage as indicated at 117 in FIGURE 2. The front vertical edge of the side wall 114 bears against a boss formed on the frame 1. The pivot 113 extends through a hole in the actuator and the side wall 114 and is threadedly connected to the side wall 16 for pivotally supporting the actuator and also assists in holding the closure connected to the frame. A pair of screws 118 extend through the side wall 14 and threadedly connect with the side wall 114 to firmly secure the frame and closure together to form a generally triangular housing. The frame and closure are snugly interfitted to promote rapid assembly thereof, stability and exclude foreign matter.

The lever includes a top wall 119, side walls 120 and an arcuate rear wall 121 which substantially corresponds to the curvature of the offset wall 115 but is of a size to permit the arcuate wall to be positioned behind the offset wall when the lever is depressed into the housing formed by the walls of the frame and closure. The lever is guided by the side walls of the frame and closure and its top wall is preferably corrugated to facilitate manipulation of the lever. The fore edge of the top wall is preferably so located with respect to the top wall 14 of the frame that it will engage the top wall to limit upward movement of the lever as depicted in FIGURE 14. The arcuate wall 121 and top wall 119 of the lever are preferably joined or reenforced by an internal rib 122 which also serves as a support for a leaf spring 123. One end of the spring is disposed in a channel seat 124 formed at the fore edge of the rib 122 and a screw 125 extends through the spring and into the rib for anchoring the spring in place so that a curved free extremity 126 thereof will continuously bear against the portion 64 of the bridge 63 connecting the plunger rods 40 as illustrated in FIGURES 13 and 14. The leaf spring serves to assist in normally maintaining the lever in position for operation as shown in FIGURE 14 and when the lever is depressed the free extremity 126 of the spring will slide on the bridge and cam the bridge and plunger rods forwardly, including the spool unit, guard ring and line pickup as shown in FIGURE 13. The leaf spring being much weaker than the plunger springs 62 also serves to ease the lever into proper driving relation with the bridge while preventing rattle or vibration between the lever and rods and spool assembly.

Figures 7, 8, 9, 10, 11:
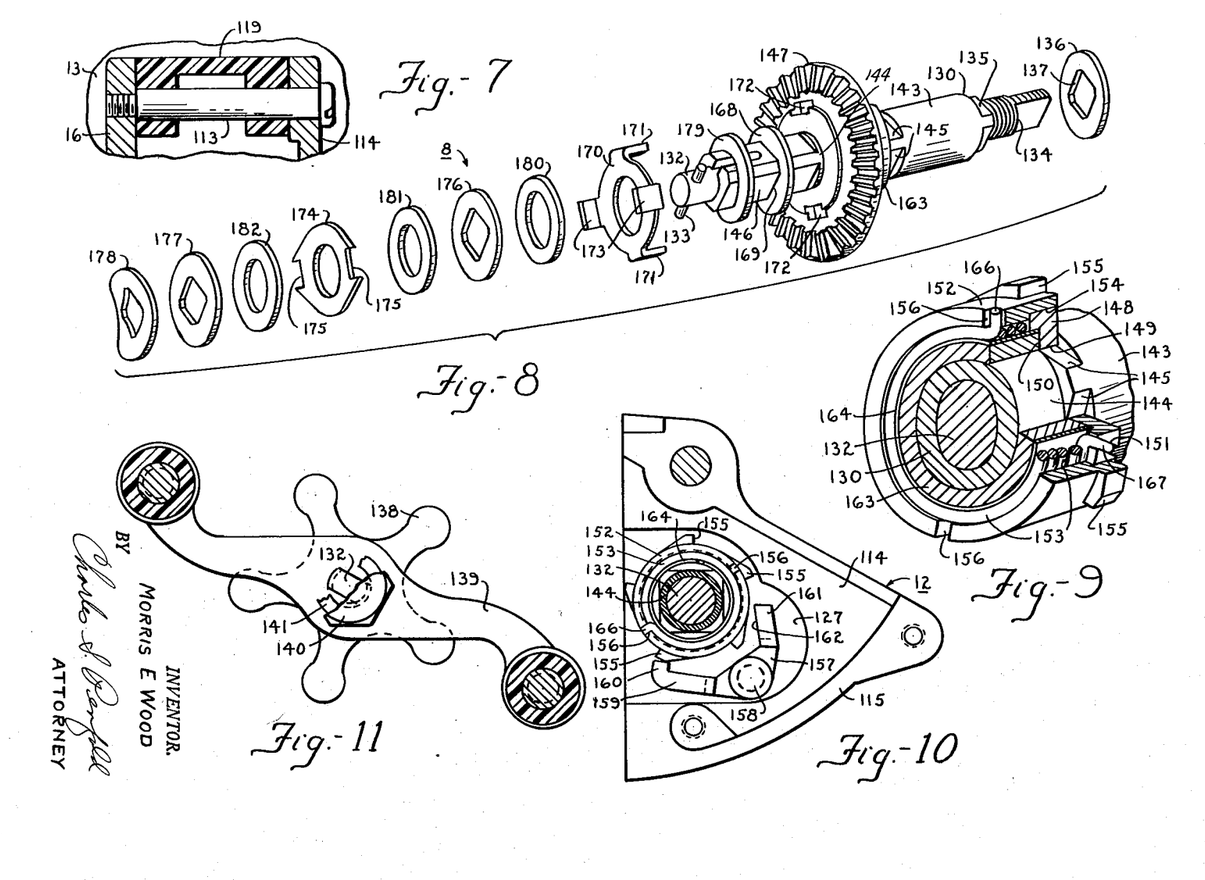
FIGURE 7 is a partial section depicting the manner of mounting the actuator on the reel frame structure.
FIGURE 8 is an exploded view illustrating the drive mechanism and particularly the drag means operatively associated therewith.
FIGURE 9 is a partial section exemplifying the spring clutch mechanism mounted on the drive assembly.
FIGURE 10 is a partial view showing a pawl operatively cooperating with a component of the spring clutch mechanism.
FIGURE 11 is a view of the crank, a star wheel for operating the drag and handles on the crank shown in section.

The operating or driving mechanism 7 for rotating the pickup 5 will now be described. The side wall 114 of the closure 12, as clearly shown in FIGURE 12, is provided with a recessed boss 127 having an opening therein within which is secured a reduced end of a tubular bearing 128 by upsetting the end against the inner side of the boss as at 129. A tubular member 130 is mounted in the tubular bearing 128 for rotational movement and is provided with longitudinal slots 131 at its inner end. A solid drive shaft 132 extends through the tubular member and is keyed thereto for rotational and axial movement by providing its inner end with a cross-pin 133 which extends through the slots 131. The outer end of the solid shaft is threaded and also squared to provide shoulders 134 as shown in FIGURES 7 and 12. The outer end of the tubular member 130 is squared at 135 and a washer 136 having a squared opening 137 receives the squared portion 135. A star wheel 138 engages the outer end of the tubular member and washer 136 and is threadedly connected to the solid shaft 132 for convenient manipulation adjacent a hand crank 139. The crank has a squared opening which receives the squared portion of the solid shaft to key the crank thereto. A nut 140 secures the crank to the shaft and against the shoulders 134. A washer 141 is interposed between the crank and nut and a resilient washer 142 is interposed between the star wheel and crank for engagement therewith. The star wheel serves to move the solid shaft axially in the tubular member to impart a thrust action to the drag means 8 carried by the tubular member and which will be presently described.

The tubular member 130 is provided with a cylindrical portion 143 of a length substantially corresponding to the length of the bearing 128, a reduced cylindrical portion 144, a squared portion 145, and an inner squared end 146 having the slots 131 therein. A drive gear 147 is rotatably mounted on the reduced cylindrical portion 144 of the tubular member and a spring clutch mechanism is provided for operatively connecting the gear for rotation with the tubular member or permitting relative reverse rotation between the gear and member.

The clutch mechanism is unique in character and includes a bronze collar 148 having a squared opening 149 which embraces the squared portion 145 of the tubular member for keying the collar thereto. This collar is also provided with a cylindrical recess 150 and a diagonal slot 151 in its periphery. The clutch also includes an annular ratchet sleeve element 152 and a helical spring 153. The sleeve 152 is provided with a recess 154 within which the collar is seated, with exterior ratchet teeth 155 at one end of the element and with diametrically disposed notches 156 at its opposite end. The sleeve bears against the upset end 129 of the tubular bearing 128 with the teeth positioned for selective engagement with a pawl 157 secured substantially within the recessed boss 127 by a pin 158 as depicted in FIGURE 10. The pawl includes a leg 159 having an offset 160 for selective engagement with the teeth and a leg 161 disposed angularly with respect to the leg 159 and provided with a cam surface 162 for selective engagement with the teeth. The arrangement is preferably such that when the sleeve rotates with the gear in a counter-clockwise direction as viewed in FIGURE 10, the teeth will cooperate with the pawl in a manner whereby the cam surface 162 on the leg 161 will engage a tooth and cause the pawl to pivot so that the offset 160 on the leg 159 will move inwardly between a pair of adjacent teeth remote from the tooth being engaged by the cam surface and thereby place the offset in a position to engage one of the adjacent pair of teeth and thereby prevent reverse rotation of the sleeve 152, tubular member 130, drive shaft 132 and crank while allowing reverse rotation of the gear relative to the tubular member 130 under the influence of the drag means 8, the latter of which will be described in detail subsequently. The organization is also such that the offset 160 on the leg 159 may engage a tooth to cause the end of the other leg 161 to engage a different tooth and prevent reverse rotation of the sleeve 152.

The drive gear is provided with a tubular skirt portion 163 which revolves on the reduced cylindrical portion 144 of the tubular member 130. A thin wrap or sleeve 164 of bronze or equivalent material is mounted on the tubular portion and the helical spring 153 encircles the wrap. The wrap serves to prevent galling between the spring and tubular portion and promote smoothness of operation. The sleeve 152 surrounds the collar 148 as mentioned above and also surrounds the spring and is disposed in an annular groove 165 provided in the gear in concentric spaced relation to its tubular portion with the inner end of the spring engaging an adjacent annular abutment on the gear, as shown in FIGURE 12. The relationship of these components has proven desirable as it confines the spring in a manner to prevent release of any portion thereof when the spring is expanded by the clutch. The spring has an offset end 166 which is caught in one of the notches 156 in the sleeve 152 and an offset end 167 which is caught in the diagonal slot 151 in the collar 148. It will be noted that the end of the tubular portion 163 of the gear is seated in the cylindrical recess 150 provided in the collar and that portions of the spring 153 and sleeve 152 extend into the annular groove 165 in the gear.

The components of the spring clutch are constructed for efficient operation and are so arranged that when the tubular member 130 and solid shaft 132 therein are rotated in a clockwise direction by the crank, as viewed in FIGURE 12, the collar 148 being keyed to member 130 will cause the spring 153, having one end attached to the collar, to contract and tighten itself upon the wrap or sleeve 164 on the tubular portion 163 of the gear 147 and drive the gear to effect rotation of the pinion gear 81 and driven shaft 4 and pickup 5 thereon. When a cast is made and a reverse rotation of the pickup is encountered, for example, by a caught fish pulling on the line, the pinion gear will rotate the drive gear in a reverse direction and cause one of the ratchet teeth to engage either the offset 160 on the leg 159 of the pawl or the end of the other leg 161 to prevent reverse rotation of the sleeve and this will result in an expansion of the spring 153 to automatically release its gripping action on the gear and thereby permit the drive gear to run free, subject to the friction produced by the drag means 8, which friction may be varied by manipulating the star wheel 138.

Describing further the operation of the clutch structure the coil spring is of a left hand wound character and has one end attached to the tubular member 130 through the agency of the collar 148 keyed to such member so that the spring is adapted to be operated by the member. Clockwise rotation of the tubular member 130 and spring drives the gear through the frictional contact between the gear and spring. As the driving force increases, the spring is forced into tighter contact or engagement with the tubular skirt portion 163 of the gear. The opposite end of the spring is attached to the ratchet sleeve 152 within which the coils of the spring are disposed. The inside diameter of the sleeve is predetermined. The pawl 157 engages the ratchet to prevent counter-clockwise rotation of the ratchet sleeve, but allows clockwise rotation thereof. When the tubular member 130 is turned clockwise, the ratchet wheel, driven by the spring, engages the pawl and is stopped. Further rotation of the member 130 causes the spring to expand, or increase in diameter until it contacts the inner cylindrical surface of the sleeve 152, and this action stops rotation of the member 130 and frees the drive gear for rotation relative to the member. If the counter-clockwise driving force is applied to the gear and the tubular member 130 is free to follow the same action occurs. Clockwise rotation of the member 130 contracts the spring and restores positive drive action on the gear.

The drag means 8 may be designed and constructed in various ways but as illustrated primarily in FIGURES 8 and 12, preferably includes a flat metal washer 168 having a squared opening 169 which receives the squared portion 146 of the tubular member 130 and bears against a shoulder adjacent the squared portion. A metal retainer member 170 is rotatably mounted on the portion 146 of the member 130 and is provided with a pair of diametrically disposed fingers 171 extending axially into a pair of recesses 172 formed in the gear for keying the retainer for rotation therewith. The retainer also has a pair of similar fingers 173 spaced midway between the fingers 171 and extending in an opposite direction. A flat metal washer 174 is mounted on the member 130 and provided with diametrically disposed notches 175 which receive the fingers 173 for keying the washer thereto. Flat metal washers 176 and 177, similar to washer 168, are also keyed to member 130. A bowed spring washer 178 is mounted on member 130 and bears against the washer 177. A plurality of corresponding friction producing elements, preferably constructed of some desirable resilient material, such as leather, are interposed between certain of the washers and retainers. More particularly in this respect, an element 179 is interposed between the washer 168 and retainer; an element 180 between the retainer and washer 176; an element 181 between washer 174 and washer 176, and an element 182 between washers 174 and 177. The spring member 178 is so disposed against rotation on the member 130 that the cross-pin 133 bears on the spring and its curved edges against the washer 177 as viewed in FIGURE 12. With this setup the drag on the pickup may be readily varied by merely manipulating the star wheel which is conveniently located adjacent the crank.

Attention is directed to the fact that the components of the drag means 8, spring clutch, drive gear, tubular member and drive shaft are all operatively related to comprise a compact subassembly which can be readily attached to the closure 12, constituting a support or mounting therefor, by merely inserting the assembly into the bearing 128 and then successively applying the washer 136 to the tubular member and the star wheel, washer 142, crank 139, washer 141 and nut 140 to the drive shaft 132.

The operating sequence of the reel will now be described. The reel, as shown in FIGURE 12, is in the line retrieving position. The line enters the reel housing through the eye 68, extends through the passage 66, engages an outer surface of the brake drum, turns inwardly at substantially a right angle over the rear peripheral edge 58 of the drum, between the pickup fingers 61 and is wound onto the spool 2 in a clockwise direction by any one of the pickup fingers when the crank 139 is turned in a right hand direction. The crank is prevented from appreciable reverse or left hand rotation at all times by the ratchet or anti-reverse mechanism comprising the sleeve 152 and pawl 157 through the spring clutch.

The drive gear 147, mounted on the tubular member 130, is driven through the clutch when the drive shaft 132 and member 130 are rotated by the crank. As mentioned above, the drive gear is released by the clutch for reverse rotation relative to the member 130 when any one of the ratchet teeth on the sleeve 152 engage the pawl when a force is exerted on the pickup to cause reverse rotation of the drive gear through the pinion. Variable drag or driving friction is readily obtained by merely tightening or loosening the star wheel 138 threaded on the solid shaft 132.

To cast a bait at the free end of a line the actuator lever 10 is pushed downwardly to impart forward movement to the spool assembly, through the plunger or push rods 40, which are connected to the spool assembly, and fitting 29. Forward travel of the spool assembly causes the latter to engage and move the line pickup therewith, and during this movement, the line guard 3 contacts the peripheral edge 58 of the brake drum to impart a braking action on the line. As the spool assembly is moved further in a forward direction, the line guard remains in stationary contact with the brake drum 6 and the braking pressure is maintained through the flexing of the spring fingers 42 of the flexible member 33. The forward motion of the spool assembly may be continued and when the pickup reaches a predetermined position, the slidable elements 105 will move radially inward through the force of the spring 110 and cause the inner legs 107 of the elements to engage the reduced portion 77 of the spindle 70, and as manual pressure is released on the actuator or control lever 10 the inner legs 107 will engage the shoulder 112 and thereby prevent the pickup from moving rearwardly along with the spool.

Rearward travel of the spool, as well as the return of the lever 10 to normal position, is accomplished through the action of the helical springs 62 about the rods 40. As the spool moves rearwardly the rear rim or edge abutment 54 of the spool flange 31 seats against the base wall or flange 55 of the line guard. The line guard is then moved away from the rear edge of the brake drum, releasing the braking action on the line. The size of the opening or passage defined by the edge of the drum and the line guard can be readily controlled by the manual movement of the lever 10 to any desired amount ranging from a full braking pressure to an open, free passage for the line.

The line guard and brake drum are free to rotate. More particularly in this regard, when, during a cast, the spool assembly is moved forwardly and the line opening defined by the guard ring and drum is reduced to the point that the line will contact the ring and drum, a rotational force will be imparted to them by the line as it unwinds from the spool. Further reduction of the line opening will increase the rotational force on the line guard ring and drum until they are in contact with sufficient pressure to prevent passage of the line therebetween and from the spool. This construction and action is unique and affords a "feathering" or graduated line controlling means, and thereby eliminates the sudden braking action usually inherent in spinning reels of this type.

To return the pickup to its operative line directing position, the crank is rotated, which through the gear-train, comprised of gears 81 and 147, rotates the pickup. As the pickup and drum rotate with respect to the longitudinal axis of the spindle the inner legs 107 of the slidable elements 105 will be first urged onto the squared portions 79 of the spindle and then find their way back onto the cylindrical portion 75 through the action of the springs 109 and 111, and thereby place the pickup in position to reengage and direct the line onto the spool which serves as a support for the line. The drag means functions as previously set forth.

The use of the term "squared" as applied to various portions of the components, openings or apertures therein is to be construed broadly, because such term is intended to include any means for keying or otherwise preventing relative movement between the components.

By way of further explanation, the typical construction employed in spinning reels consists of a line pickup device rotating about a stationary spool for the purpose of winding line onto the spool. During the casting operation the line pickup is moved to a different position to allow the line to be pulled freely over an end of the stationary spool. The spool is usually frictionally mounted to allow the spool to rotate and adjusting means are provided to increase or decrease the friction placed on the spool to regulate the force required to pull line from the spool. The retrieving, or line winding action, causes a twist to be generated in the line. The casting action removes this line twist. However, the reverse of this condition may occur. The casting will cause the twist and the retrieve will remove the line twist. Either set of conditions is established by the manner in which the line is originally wound onto the spool. The above conditions will not increase line twist as the reel is used, but will remain constant. This is true only if the spool does not rotate. If at any time the spool is allowed to rotate while the line is engaged by the line pickup, line twist will be generated and will remain in the line. This twisting will occur any time the line is stripped from the reel against the drag and/or retrieve is attempted while the drag is slipping. Whenever the line is wound onto the spool by rotating the line pickup the drag should be so arranged to allow the pickup to rotate in an opposite direction to take line from the spool. The line must be wound onto the spool and taken from the spool in the same manner. If this condition is not met, line twisting will occur.

The clutch mechanism of the subject invention was designed to overcome this condition and in further support of its operation, attention is directed to the fact that the clutch spring is wound left hand. One end of the spring is keyed, through a washer, to the tubular member or gear staff, the other end being keyed to the anti-reverse ratchet mechanism. As the crank is turned forward to retrieve line, the spring diameter is decreased and closes around the drive gear hub, to drive the gear in a clockwise direction. When the crank is released or otherwise allowed to rotate in a counter-clockwise direction, the spring increases in diameter, releasing the gear hub, and tightening against the inside diameter of the anti-reverse ratchet. This action locks the ratchet to the gear staff, and releases the drive gear for free rotation against the adjustable drag. The clutch may also be used in conjunction with the adjustable drag to provide a compound or dual range drag. If the cranking force is not removed to allow the crank to rotate slightly in a counter-clockwise direction the clutch spring will remain in contact with the gear and aid the adjustable drag in preventing counter-clockwise rotation of the gear. This will increase any preset drag force by approximately four times. When the crank is released the clutch releases allowing the gear to rotate with the adjustable drag alone.

Having thus described my invention, it is obvious that various modifications may be made in the same without departing from the spirit of the invention, and, therefore, I do not wish to be understood as limiting myself to the exact form, construction, arrangement, and combination of parts herein shown and described.

I claim:

1. A spinning reel comprising a line support, a rotary shaft extending through the support, means including a brake mounted on the shaft, a pickup carried by said means, a line engaging element supported on the line support, means including a spring clutch operable to rotate the pickup in one direction to deliver line onto the support and allow reverse rotation of the pickup, means for moving the line support and line engaging element forwardly to cause the element to engage the brake and thereby retard movement of a line therebetween, and drag means for imparting a variable retarding action to the pickup when reversely rotated.

2. A spinning reel comprising a frame, a line support mounted at the front side of the frame, a rotary shaft extending through the frame and support, a brake mounted on the shaft, a line pickup mounted for movement with the shaft, a member mounted rearwardly of the pickup for movement with the line support, driving means including a clutch for rotating the pickup in one direction to deliver line onto the support, means for moving the support forwardly a predetermined distance to cause the brake and member to retard movement of a line from the support at a location exteriorly of the support, and means associated with the driving means and clutch for causing a drag action to occur between the pickup and driving means when the pickup is rotated in a reverse direction.

3. A reel of the kind described comprising a frame provided with a spool, shaft means movably supported in the frame and provided with a pinion at its inner end and a pickup at its outer end for directing a line onto the spool, a drive assembly mounted on the frame and comprising a tubular bearing secured to the frame, a tubular member journalled in the bearing, a drive gear engaging the pinion journalled on the member and having a tubular extension, a fitting keyed to said member, an annular ratchet element mounted for rotation in concentric spaced relation to the extension, a pawl carried by the frame for engagement with the ratchet for limiting its rotation in one direction, a helical spring surrounding the extension and having ends respectively secured to said fitting and element, drag means operatively connected to said gear and member, a shaft extending through and keyed to the member, means on the shaft for moving the shaft axially in the member for adjusting the drag means, and a crank carried by the shaft for rotating the shaft and member in one direction to cause the spring to contract and grip the extension of the gear to drive the latter for rotating the pickup through the agency of the pinion, said gear when rotated in a reverse direction by the pinion through reverse rotation of the pickup causing expansion of the spring to disengage said extension so that the drag means may be utilized to retard reverse rotation of the gear and pickup.

4. A driving and drag assembly for use with a fishing reel, said assembly comprising a frame provided with a tubular bearing and a pawl adjacent said bearing, a tubular member journalled in said bearing, a gear journalled on said member and provided with a tubular extension, a fitting keyed to said member, a ratchet sleeve mounted in concentric spaced relation to said extension and engageable with said pawl for limiting substantial rotation of the sleeve in one direction, a helical spring arranged in the space between said extension and sleeve and having ends respectively connected to said fitting and sleeve, an element keyed to said member and an element keyed to said gear with friction means interposed between said elements, a shaft extending through said member and having an abutment at its inner end and a nut at its outer end for moving the shaft axially in the member for regulating pressure contact of said elements and friction means to obtain a drag action to control relative rotation between said member and said gear, a crank carried by said shaft, the arrangement being such that when said member, shaft and sleeve are rotated by said crank in one direction said spring will contract and grip said extension to drive said gear and when said gear is rotated in a reverse direction said spring will expand from said extension and thereby subject such reverse rotation of said gear to the influence or control of the drag action if so desired.

5. An assembly for use in a fishing reel comprising a tubular bearing, a tubular member journalled in the bearing, a gear journalled on the member and provided with a cylindrical extension, a spring clutch connected to said member and located on one side of the gear in surrounding relation to said extension for operative gripping connection therewith for locking the gear for rotation with the member in one direction, and drag means carried by the member and having a part extending into the opposite side of the gear, said clutch and drag means being coactive to control the operative connection and relative rotation between said member and gear.

References Cited in the file of this patent

UNITED STATES PATENTS

| 850,580 | Holzmann | Apr. 16, 1907 |
| 1,791,768 | Berkel | Feb. 10, 1931 |
| 1,836,755 | Hirsch | Dec. 15, 1931 |
| 1,981,430 | Scott | Nov. 20, 1934 |
| 2,271,883 | Bannister | Feb. 3, 1942 |
| 2,613,468 | Hand | Oct. 14, 1952 |
| 2,675,192 | Hull | Apr. 13, 1954 |
| 2,776,803 | Shakespeare et al. | Jan. 8, 1957 |
| 2,777,645 | Wood | Jan. 15, 1957 |
| 2,792,792 | Seewer | May 21, 1957 |
| 2,828,088 | Denison et al. | Mar. 25, 1958 |
| 2,918,227 | Mauborgne | Dec. 22, 1959 |
| 2,922,595 | Holahan | Jan. 26, 1960 |

FOREIGN PATENTS

| 386,358 | Great Britain | Jan. 19, 1933 |
| 473,239 | Great Britain | Oct. 8, 1937 |